(No Model.)

M. KIRKPATRICK.
COMBINED SEED PLANTER AND HARROW.

No. 314,141. Patented Mar. 17, 1885.

WITNESSES
Edwin L. Jewell.
J. J. McCarthy.

INVENTOR
Monroe Kirkpatrick
By C. M. Alexander
ATTORNEY

UNITED STATES PATENT OFFICE.

MONROE KIRKPATRICK, OF SMITHVILLE, MISSISSIPPI.

COMBINED SEED-PLANTER AND HARROW.

SPECIFICATION forming part of Letters Patent No. 314,141, dated March 17, 1885.

Application filed July 9, 1884. (No model.)

*To all whom it may concern:*

Be it known that I, MONROE KIRKPATRICK, a citizen of the United States, residing at Smithville, in the county of Monroe and State of Mississippi, have invented certain new and useful Improvements in Combined Seed-Planters and Harrows, of which the following is a specification, reference being had therein to the accompanying drawings.

My invention relates to certain improvements in combined seed-planters and harrows, and is designed to produce a planter that may or may not be used with the harrow; also a harrow that may be adjusted as to size.

Other points will be set forth in the following description, reference being had to the annexed drawings, in which—

Figure 1:
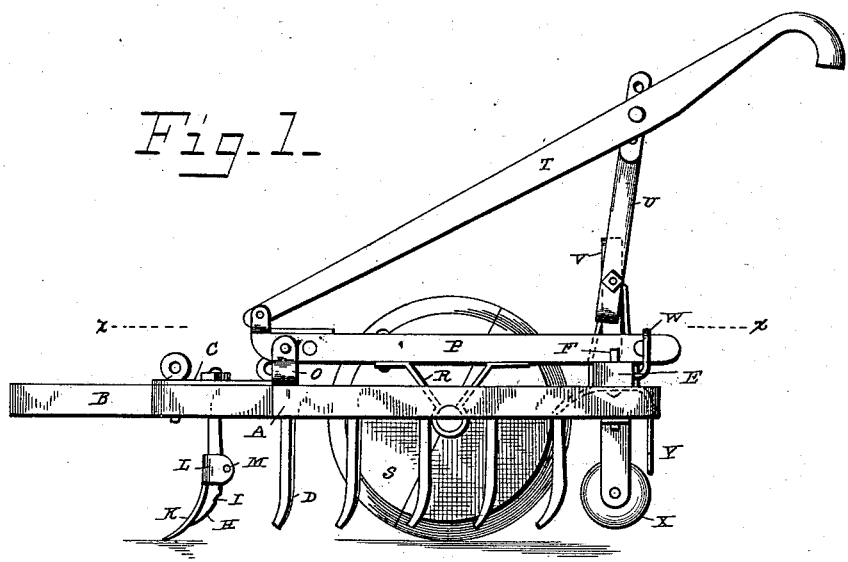
Figure 2:
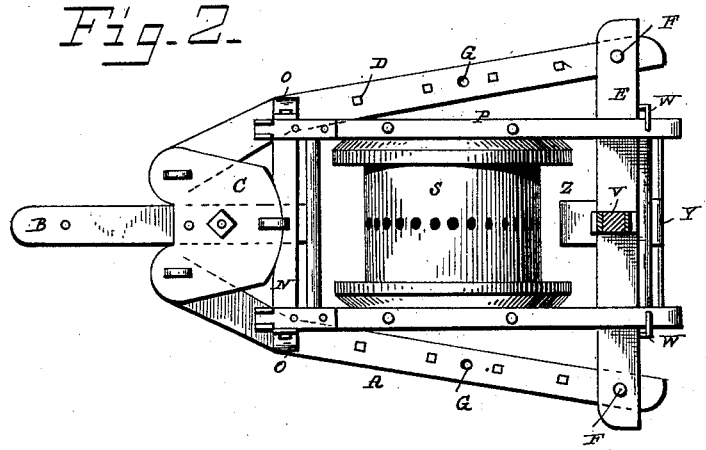
Figure 3:

Figure 1 represents a side elevation of the device; Fig. 2, a section and plan through *x* *x* of Fig. 1, and Fig. 3 a detail of the covering-roller.

A designates the side pieces of the harrow proper. The forward ends of these pieces are at an angle to the longer part, as shown.

To the beam B is secured, preferably by bolting, a plate, C, which may have a duplicate under the beam for strength, and to which is removably pivoted the angular ends of the sides of the harrow. The harrow sides or beams have harrow-teeth D arranged in them, and have their rear ends connected by a cross-piece, E, the securings being pins F. About midway on the side beams of the harrow are holes G, for the purpose of pinning the cross-piece E at that point, and thus widening the harrow, if desired. The beams can be reversed so that the forward angular pieces will rest against the beam B, and by the use of the cross-piece E and the two sets of holes two more sizes of harrow obtained. The front harrow-tooth, H, secured to the beam B, has notches I in it for adjusting the plowshare K, the top of which has ears L, embracing the said tooth, a bolt or pin, M, passing back of the tooth and engaging in the notches or indentations.

Secured to the forward end of the harrow is a cross-piece, N, having each end formed into a standard or support, O. Between these supports is pivoted one end of a frame, P, which has centrally affixed to it the extended journals R of the roller and seed-drum S. The extreme forward end of the frame P has pivoted to it the backward-extending handles T, which are adjustably supported toward the rear by the spreading-standard U, pivoted to an upright post, V, secured and braced in the cross-piece E of the harrow. Extending upward from the said cross-piece E are two pivotal hooks, W, adapted to catch over the end of the frame P, and also act as a support when the rear of the frame is raised by a forward pressure on the handles. This upward movement raises the roller from the ground and allows the harrow-teeth to enter. It also allows the roller to accommodate itself to uneven ground, and also stops the flow of seed when desired. When the device is moved from place to place, the roller is pressed down so as to elevate the teeth and prevent them engaging with the said ground. Suitable devices for closing the seed-orifices may be used when wanted.

To the cross-piece E is secured a frame or support, in which is journaled the covering-roller X, having a concaved center, so as not to press the ground over the seed too hard or compact. Behind this roller is adapted to rest the scraper and cleaner Y, which may take the place of the roller and act as a seed-coverer. The scraper Y is secured to the cross-piece E, and has a forward continuation, Z, forming a cleaner for the roller S. The roller is formed of two parts bolted together, and has its central portion of somewhat less diameter than the outer portions or rims. The central portion has a section removable, so as to allow the seed to be inserted, and is provided with orifices for the proper escape of the same. Arms may be secured to the shaft to agitate the seed.

When the device is used as a seeder, the harrow-teeth, with the exception of the front one, are removed, and when the device is used as a harrow the seeding device is removed.

Having described the device, what I claim is—

1. In combination with a harrow, a seed cylinder or roller supported by a frame pivoted to the harrow near the front, and normally resting on the rear cross-piece of said harrow and operated by handles, substantially as and for the purpose specified.

2. In combination with a harrow, a frame pivoted to near the front thereof and projecting beyond the pivotal point, and handles pivoted to said projections, and also to a support pivoted to an upright on the rear of said harrow, the frame carrying seeding cylinder or roller, and operated substantially as and for the purpose specified.

3. In combination with a harrow, a frame supporting the seeding mechanism of a seed-planter, said frame pivoted to the raised ends of a cross-piece near the front of said harrow and extending beyond them, handles pivoted to the projecting ends of the frame, and a pivoted support secured to an upright on the harrow at the rear, said support having a series of holes, by which the handles may be adjustably connected to it, substantially as and for the purpose specified.

4. The combination of the variable harrow-frame having removably secured to its front tooth an adjustable plow, and to its rear a concave centered roller and an interchangeable double scraper, of a seeding-roller frame supporting the roller and pivoted near the front of the harrow, the handles connected to the front of the frame, and adjustably connected to a support pivoted to an upright secured to the rear cross-piece of the harrow, and the pivotal hooks secured in the said cross-piece and holding or supporting the roller-frame.

In testimony whereof I affix my signature in presence of two witnesses.

MONROE KIRKPATRICK.

Witnesses:
J. H. GETTYS,
J. B. CHEEK.